United States Patent
Paczkowski et al.

(10) Patent No.: US 9,191,817 B1
(45) Date of Patent: Nov. 17, 2015

(54) SECURITY KEY BASED AUTHORIZATION OF VOICE CALL IDENTIFICATION NUMBERS IN WIRELESS COMMUNICATION DEVICES

(71) Applicant: Sprint Communications Company L.P., Overland Park, KS (US)

(72) Inventors: Lyle Walter Paczkowski, Mission Hills, KS (US); Stephanie Marie Lashley, Parkville, MO (US); Wade C. Burris, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 82 days.

(21) Appl. No.: 14/021,248

(22) Filed: Sep. 9, 2013

(51) Int. Cl.
*H04W 12/06* (2009.01)

(52) U.S. Cl.
CPC ..................................... *H04W 12/06* (2013.01)

(58) Field of Classification Search
CPC ..... H04W 12/06; H04W 88/06; H04W 84/14; H04W 68/00; H04W 36/00; H04W 40/00; H04W 4/00; H04M 3/42042
See application file for complete search history.

(56) References Cited

U.S. PATENT DOCUMENTS

| | | | |
|---|---|---|---|
| 8,335,503 B1* | 12/2012 | Desmond et al. | 455/422.1 |
| 8,811,977 B2* | 8/2014 | Austin et al. | 455/423 |
| 2007/0070935 A1* | 3/2007 | Prakash et al. | 370/328 |
| 2009/0088133 A1* | 4/2009 | Orlassino | 455/411 |
| 2009/0305671 A1* | 12/2009 | Luft et al. | 455/411 |
| 2010/0330986 A1 | 12/2010 | Rahman et al. | |
| 2012/0044908 A1* | 2/2012 | Spinelli et al. | 370/331 |

FOREIGN PATENT DOCUMENTS

| | | |
|---|---|---|
| EP | 1842392 | 7/2006 |
| WO | 2006077587 | 7/2006 |

* cited by examiner

*Primary Examiner* — Kashif Siddiqui
*Assistant Examiner* — Ather Mohiuddin

(57) ABSTRACT

Systems, methods, and software for operating communication systems and wireless communication devices are provided herein. In one example, a method of operating a wireless communication is provided. In processing circuitry of the wireless communication device, the method includes receiving a user request in an application for a voice call over a wireless communication network. In security circuitry of the wireless communication device, the method includes processing the request and a security key associated with the wireless communication network to authorize an identification number for the voice call over the wireless communication network, and indicating the identification number to the application. In a communication transceiver of the wireless communication device, the method includes, responsive to the application initiating the voice call using the identification number, exchanging communications of the voice call over the wireless communication network.

18 Claims, 5 Drawing Sheets

SECURITY KEY BASED AUTHORIZATION OF VOICE CALL IDENTIFICATION NUMBERS IN WIRELESS COMMUNICATION DEVICES

TECHNICAL FIELD

Aspects of the disclosure are related to the field of communication systems, and in particular, authorization of identification numbers for voice calls in wireless communication devices based on security keys.

TECHNICAL BACKGROUND

Wireless communication systems typically include wireless access systems with equipment such as wireless access nodes along with various control and routing nodes which provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

In some wireless communication systems, more than one wireless communication network can be employed across a similar geographic region, with each wireless communication network including one or more sectors of wireless coverage. For example, a first wireless network employing a first wireless communication protocol can be deployed along with a second wireless network employing a second wireless communication protocol. Separate wireless access equipment can be deployed for each wireless network, such as when a fourth generation (4G) Long Term Evolution (LTE) wireless network is deployed over a similar geographic area as a third generation (3G) wireless network or other wireless networks.

Wireless communication devices can be configured to support multiple wireless access modes, such as communicating with one or more wireless networks using one or more communication transceivers and associated equipment. Many times these multiple wireless networks are provided by a home network provider that a wireless communication device has been authorized as a home user through a paid service agreement. However, when the wireless coverage of home network provider becomes poor or falls below threshold levels, a wireless communication device can seek out wireless service from a non-home service provider, namely a roaming provider. Typically a wireless communication device must enter into a roaming mode of operation using the same phone number, mobile directory number (MDN), or mobile identification number (MIN) assigned by the home service provider in order to roam onto the wireless communication network of a roaming service provider. This roaming mode can incur larger service fees for the user and the home network operator through various roaming agreements.

Some wireless communication devices also include partitioned security 'zones' in their associated processing systems. For example, a first zone can be employed to execute open or untrusted applications and obtain untrusted or unauthenticated data, and a second zone can be employed to execute trusted applications or obtain authenticated data. These security zones can be implemented on separate microprocessors, in separate cores of a multi-core microprocessor, or otherwise allocated over different processing portions of a wireless communication device.

OVERVIEW

Systems, methods, and software for operating communication systems and wireless communication devices are provided herein. In one example, a method of operating a wireless communication is provided. In processing circuitry of the wireless communication device, the method includes receiving a user request in an application for a voice call over a wireless communication network. In security circuitry of the wireless communication device, the method includes processing the request and a security key associated with the wireless communication network to authorize an identification number for the voice call over the wireless communication network, and indicating the identification number to the application. In a communication transceiver of the wireless communication device, the method includes, responsive to the application initiating the voice call using the identification number, exchanging communications of the voice call over the wireless communication network.

In another example, wireless communication device is provided. The wireless communication device includes security circuitry that stores one or more security keys, processing circuitry that executes applications, and at least one communication transceiver to communicate over a plurality of wireless communication networks. The processing circuitry is configured to receive a user request in an application for a voice call over a wireless communication network. The security circuitry is configured to process at least the request and a security key associated with the wireless communication network to authorize an identification number for the voice call over the wireless communication network, and indicate the identification number to the application. The communication transceiver is configured to exchange communications of the voice call over the wireless communication network responsive to the application initiating the voice call using the identification number.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
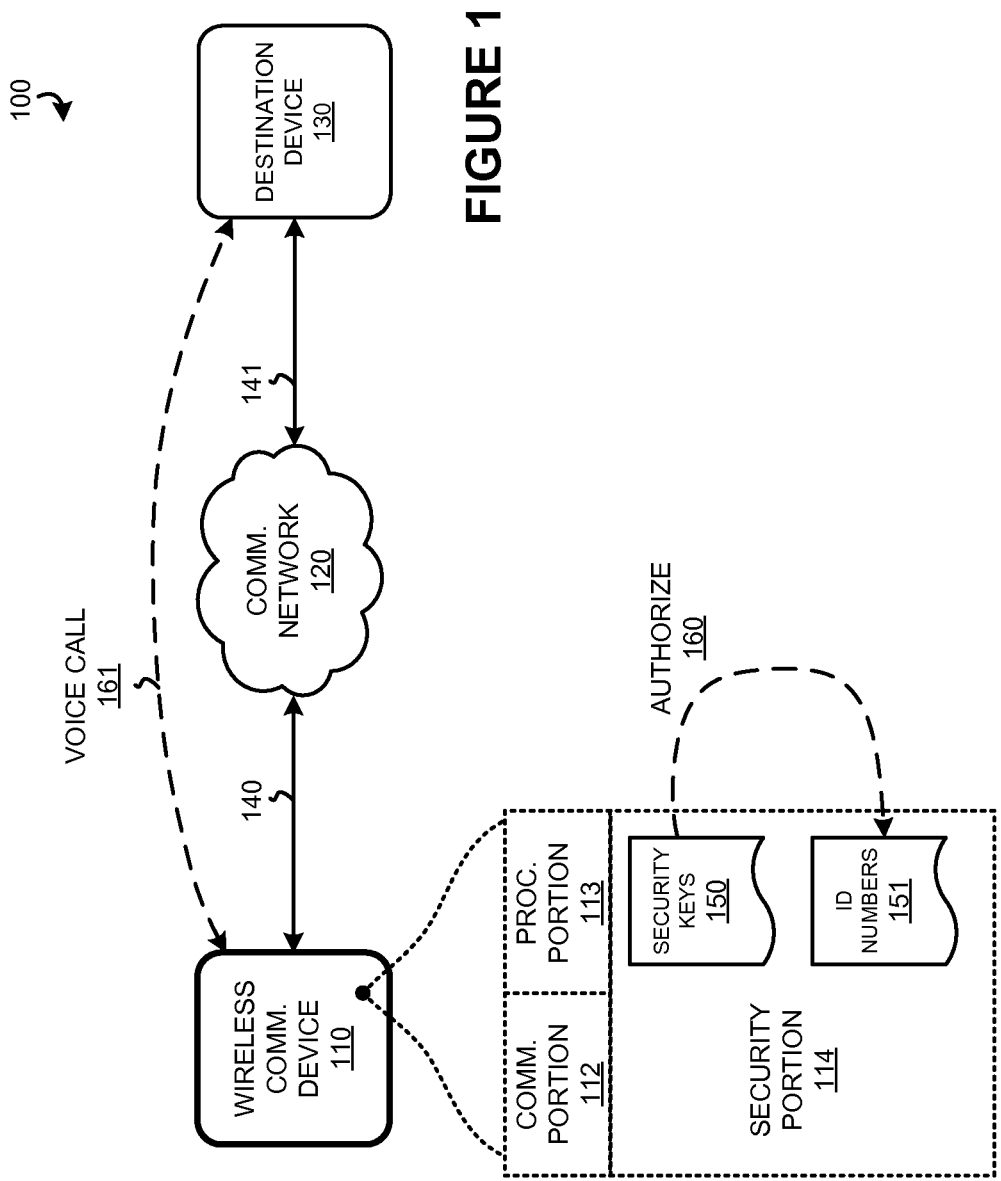
FIG. 1 is a system diagram illustrating a communication system.

FIG. 1 is a system diagram illustrating communication system 100.

Communication system 100 includes wireless communication device (WCD) 110, communication network 120, and destination device 130. WCD 110 and communication network 120 communicate over communication link 140. Communication network 120 and destination device 130 communicate over communication link 141. WCD 110 includes communication portion 112, processing portion 113 and security portion 114, which are communicatively coupled to each other. Communication portion 112 comprises one or more communication transceivers. Each communication transceiver of WCD 110 can communicate over communication links, such as communication link 140. Processing portion 113 includes processing circuitry that can execute applications. Security portion 114 includes security circuitry that stores one or more security keys 150 and identification numbers 151.

In operation, WCD 110 includes one or more communication transceivers which can communicate over one or more wireless or wired communication networks, such as over communication link 140. However, before communications can be exchanged, an identification number for a communication session, such as a voice call, is authorized by security portion 114. In some examples, WCD 110 authorizes a particular identification number with an external authorization node before the identification number can be used for a communication session. WCD 110 includes one or more security keys 150, and stores security keys 150 in storage media associated with security circuitry of security portion 114. Security keys 150 can be employed in authorizing the various identification numbers 151.

As shown in FIG. 1, when a particular identification number is requested for a communication session, such as by an application executed on WCD 110, then the particular identification number is first authorized by security portion 114 using an associated security key. In some examples, authorization process 160 occurs between WCD 110 and an external authorization node. Once a particular identification number is authorized, then communications can be exchanged using that identification number over a communication network.

Figure 2:
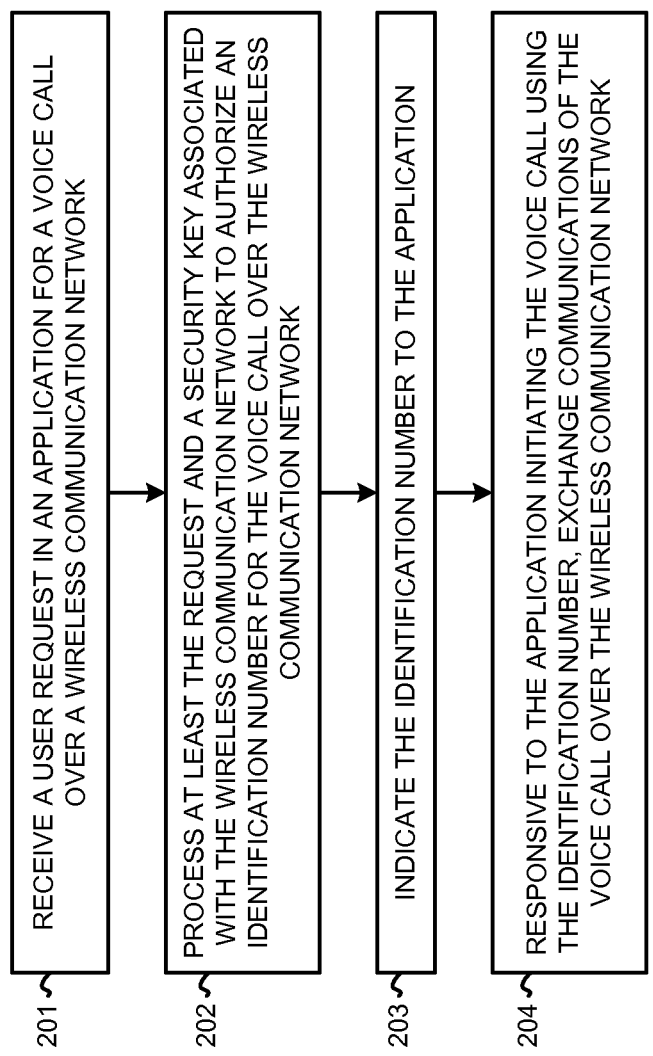
FIG. 2 is a flow diagram illustrating a method of operation of a wireless communication device.

FIG. 2 is presented to illustrate another example operation of the elements of FIG. 1. FIG. 2 is a flow diagram illustrating a method of operation of WCD 110. The operations of FIG. 2 are referenced below parenthetically. As discussed above, WCD 110 includes communication portion 112 which comprises one or more transceivers, and security portion 114 which stores one or more security keys 150 and one or more identification numbers 151. The security keys can be encryption keys, pseudorandom keys, private keys, or other security keys. The identification numbers can be phone numbers, mobile directory numbers (MDN), mobile identification numbers (MIN), mobile subscription identification numbers (MSIN), International mobile Subscriber Identity (IMSI) numbers, or media access control (MAC) addresses, including combinations thereof.

In FIG. 2, WCD 110 receives (201) a user request in an application for a voice call over a wireless communication network. In this example, the application is executed on processing portion 113, such as a voice call application, a packet voice call application, an audio or video conferencing application, or other voice call application. The request can be initiated by a user of WCD 110 interacting with the application on WCD 110, and the request is indicated or transferred to security portion 114. The voice call can be requested to occur over communication network 120 to destination device 130, although other networks and destinations can be employed.

Security portion 114 of WCD 110 processes (202) at least the request and a security key associated with the wireless communication network to authorize an identification number for the voice call over the wireless communication network. In this example, authorization process 160 occurs to authorize one of identification numbers 151 for the voice call using one of security keys 150. Authorization process 160 can include authenticating a hash result generated using one of security keys 150 associated with the identification number. This authentication can be a security handshaking process with an external authorization node.

When the identification number is authorized, security portion 114 indicates (203) the identification number to the application. The application executed on processing portion 113 can use this identification number to initiate the voice call over a communication network, such as over link 140 with communication network 120. The identification number can be used to identify WCD 110 as the originating device in the voice call. The identification number is also used to identify WCD 110 on communication network 120, such as in a registration process to obtain wireless access to communication services.

Responsive to the application initiating the voice call using the identification number, WCD 110 exchanges (204) communications of the voice call over the wireless communication network. In this example, communication transceiver circuitry of communication portion 112 exchanges communications using the identification number as an identity of WCD 110. These communications include a voice call with a destination device, namely destination device 130 over communication network 120 and associated links 140-141.

Figure 3:
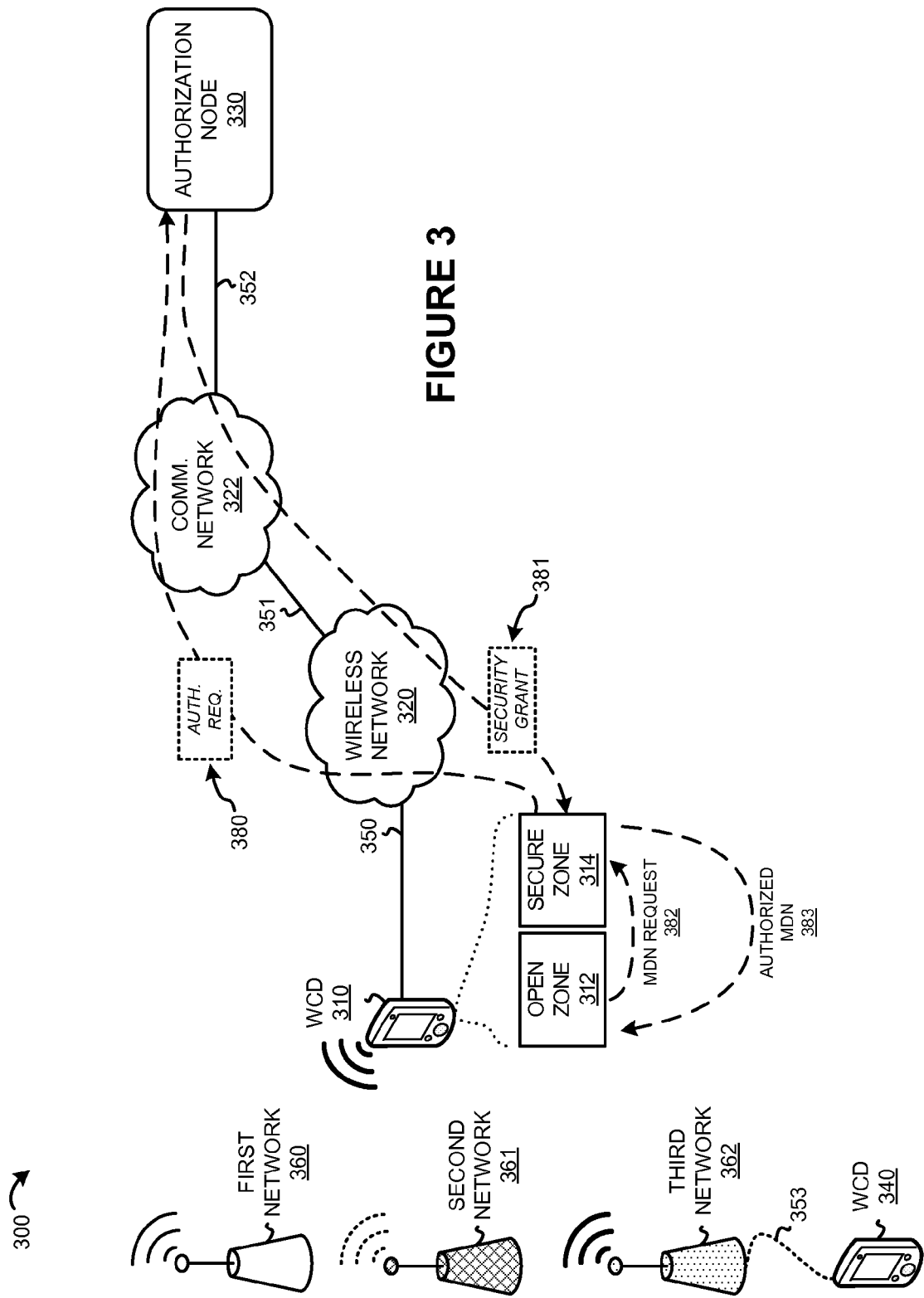
FIG. 3 is a system diagram illustrating a communication system.

As another example of a wireless communication device and associated communication and data nodes, FIG. 3 is presented. FIG. 3 is a system diagram illustrating communication system 300. Communication system 300 includes originating wireless communication device (WCD) 310, wireless network 320, communication network 322, authorization node 330, destination wireless communication device 340, and cellular voice and data networks 360-362. WCD 310 and wireless network 320 communicate over wireless link 350, which is a cellular voice and data link in this example. Wireless network 320 and communication network 322 communicate over link 351, which is an optical networking link in this example. Authorization node 330 and communication network 322 communicate over link 352, which is an Ethernet communication link in this example. Destination wireless communication device 340 and third cellular voice and data network 362 communicate over link 353, which is a Long Term Evolution (LTE) cellular voice and data link in this example.

WCD 310 includes a plurality of transceiver portions, each transceiver portion associated with a different wireless communication protocol. In this example, at least 3 transceiver portions or transceiver types are included in WCD 310, namely a Long Term Evolution (LTE) transceiver portion for communicating over third network 362, a Code Division Multiple Access (CDMA) transceiver portion for communicating over second network 361, and an IEEE 802.11 WiFi transceiver portion for communicating over first network 360. It should be understood that any number and type of transceiver portion or transceiver type can be included in WCD 310, including wired, wireless, optical, and other transceiver types using any associated communication protocol, frequencies, spectrum, and the like. WCD 340 can include similar elements as WCD 310.

WCD 310 also includes open zone 312 and secure zone 314. Each of these zones of WCD 310 can be implemented in a separate microprocessor, microprocessor core, system on a chip, virtual core, or other hardware or software partition that separates memory spaces, operating systems, drivers, and other operational hardware and software elements so as to provide a restricted level of access for applications and users to secure zone 314, and a non-restricted level of access for open zone 312. In some examples, open zone 312 comprises a standard core of a processor system, such as for operating an Android, Windows, iOS, or other user-accessible operating system. Likewise, secure zone 314 comprises in some examples, a secure core or "trust zone" core of a processor system which prevents access to the processing and memory elements of secure zone 314 unless authorized through a security exchange or security handshake with authorization node 330.

This partitioned configuration of secure zone 314 differs from user-level password protected access, in that any application that desires to execute on secure zone 314 must first be authorized by a security handshaking process with authorization node 330. Open zone 312 might run applications after a user merely "logs in" or passes a user-level security access, and the applications executed on open zone 312 are not authorized through a security handshaking process with authorization node 330. In some examples, such as found in FIG. 1, a communication portion (such as communication portion 112) is located in open zone 312, while a security portion (such as security portion 114) is located in secure zone 314. It should be understood that these partitions can be varied.

Communication networks 320 and 322 each comprise wired and wireless network equipment for routing communications between various endpoints and over various communication links. In this example, wireless network 320 comprises a home or native cellular voice and data network comprising one or more wireless access nodes distributed over a geographic area, while communication network 322 comprises an IP network including one or more routing nodes. Communication networks 320 and 322 can include elements described for communication network 120 in FIG. 1.

Authorization node 330 can include communication or network interfaces, as well as computer systems, microprocessors, circuitry, cloud-based systems, or some other processing devices or software systems, and can be distributed among multiple processing devices. Examples of authorization node 330 can also include software such as an operating system, logs, databases, utilities, drivers, networking software, and other software stored on a computer-readable medium.

Networks 360-362 are each associated with a different roaming wireless networks that WCD 310 can communicate with over an associated wireless link. In FIG. 3, third network 362 corresponds to a Long Term Evolution (LTE) cellular voice and data network, second network 361 corresponds to a Code Division Multiple Access (CDMA) cellular voice and data network, and first network 360 corresponds to an IEEE 802.11 WiFi access point, such as for a home or office data network. It should be understood that other data networks and access points can be employed, and that wireless network 320 can incorporate ones of cellular voice and data networks 360-362. Additionally, WCD 310 can include a Universal Serial Bus (USB) or other wired transceivers, such as Ethernet, which can communicate with other systems and networks which are not shown in FIG. 3 for clarity.

The home cellular voice and data network 320 indicates a communication network which is operated by a home service provider of WCD 310. A home service provider includes a service provider through which WCD 310 has previously established a communication service agreement, such as through a service contract, or by originally purchasing WCD 310 itself through that home service provider. For example, the home service provider can be Sprint due to the user of WCD 310 originally purchasing WCD 310 through Sprint and obtaining initial communication services through Sprint. During the initial acquisition of communication services from a home service provider, WCD 310 can be assigned an identity indicated by an identification number, such as a mobile directory number (MDN), mobile identification number (MIN), or other identification number which identifies WCD 310 on any communication networks for outbound and incoming communications. In contrast, a roaming service provider includes a service provider that WCD 310 is not initially authorized for home communication services, and can include a non-Sprint service provider. In this example, communication networks 360-362 represent communication networks of roaming or non-home service providers. Typically, when WCD 310 initiates a communication session on a roaming communication network, the MDN, MIN, or other identification number of WCD 310 indicates to the roaming communication network that roaming communication services are to be provided through a roaming agreement between Sprint and the non-Sprint service provider. In some instances where no roaming agreement is previously established, then the identification number of WCD 310 can be used to deny communication services over the roaming communication network.

Figure 4:
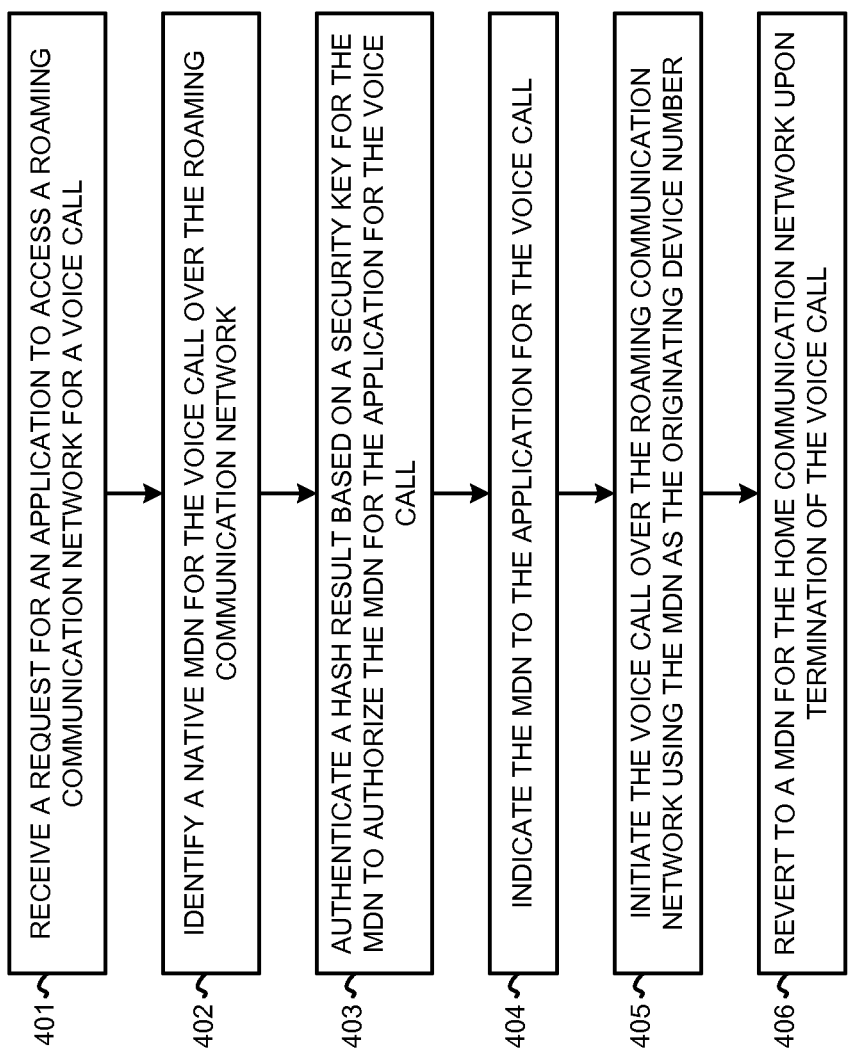
FIG. 4 is a flow diagram illustrating a method of operation of a communication system.

As an example operation of the elements of system 300, FIG. 4 is provided. FIG. 4 is a flow diagram illustrating a method of operation of communication system 300. The operations of FIG. 4 are referenced below parenthetically. In FIG. 4, WCD 310 receives (401) a request for an application to access a roaming communication network for a voice call. The request can be initiated by a user of WCD 310 over a user interface presented by an application executed on WCD 310, such as a voice call application executed in open zone 312, and transferred as request 382 to secure zone 314. The voice call application can include a phone dialer application, a voice over Internet Protocol (VoIP) application, a voice over Long Term Evolution (VoLTE) application, a voice over packet (VoP) application, or other communication application. Although a voice call is discussed in this example, it should be understood that a data session, text message, or other communication session can instead be employed.

The voice call initiated by a user of WCD 310 might be selected by a user as to occur over a user-identified communication network, such as over any of networks 360-362. In other examples, the particular communication network selected can be selected based on wireless coverage available to WCD 310. For example, WCD 310 might be in a geographic location where home communication services are not available from a home communication service provider. This geographic location might not have home communication services due to being in a different region or country that does not offer wireless coverage from the home communication service provider. The geographic location might not have home communication services due to poor signal or RF conditions presently available to WCD 310 over the home communication network, while good RF conditions are found for a roaming or other communication network.

WCD 310 identifies (402) a temporary native MDN for the voice call over the roaming communication network. In this example, secure zone 314 stores identification numbers, such as MDNs or MINs, that are accessible by secure zone 314 and not accessible by open zone 312. Request 382 can include information such as an indicator of the application which the user initiated the voice call, an application type, a preferred communication network, or other information which secure zone 314 can use in the selection of a MDN for the voice call. Secure zone 314 can store a data structure correlating various MDNs to roaming networks and application types in a non-transitory computer readable medium. This data structure, such as a table, can be used to select a temporary MDN for use by WCD 310 on a roaming network as a temporary 'native' or temporary home MDN on that roaming network. Advantageously, the temporary MDN can allow WCD 310 to receive communication services as a non-roaming device on a non-home communication network.

Secure zone 314 can identify a particular MDN based on the application or application type. For example, if a VoIP application is employed to initiate the voice call, then secure zone 314 can select an MDN associated with that VoIP application. In another example, a VoLTE application is employed, and a particular MDN associated with that VoLTE application is selected. When more than one application of a particular type is employed, then additional information can be used in the selection of the MDN, such as a username, user account, or other information provided with request 382.

Alternatively or in combination with the application or application type, secure zone 314 can identify a particular MDN based on the availability of one or more of roaming communication networks 360-362. For example, if third network 362 is available for communication services then secure zone 314 can identify and select a MDN associated with third network 362. The availability of a particular communication network can be based on a signal strength or other communication quality parameter provided by open zone 312 to secure zone 314, or can be selected by open zone 312 as being the best available communication network due to RF conditions, geographic location, or other considerations. The MDN selected can be different than a home MDN initially assigned to WCD 310 for use on the home communication network. For example, a home or original MDN for WCD 310 can be 913-555-1000, whereas the temporary MDN identified in operation 402 can be 913-555-2000. In this example, home MDN 913-555-1000 is a number registered for home communication services from wireless network 320, while temporary MDN 913-555-2000 is a number registered for temporary home communication services from a network that would normally be a roaming communication network, namely third network 362.

Prior to using the MDN identified in operation 402, an authentication or authorization process occurs to allow usage of the MDN by WCD 310. WCD 310 authenticates (403) a hash result based on a security key correlated to the MDN to authorize the MDN for the application for the voice call. In this example, secure zone 314 stores security keys, with at least one security key correlated to each MDN stored in secure zone 314. When a MDN is identified, then secure zone 314 also identifies the security key associated with the MDN and generates a hash result based on at least the security key. The hash result can be determined based on a cryptographic hash function. For example, a security key can be processed by a cryptographic hash function such as secure hash algorithm (SHA) or message digest algorithm (MD) to determine a cryptographic hash result which is used as the hash result discussed herein.

Secure zone 314 then transfers the hash result in authorization request message 380 for delivery to authorization node 330. Although in this example, authorization request message 380 is delivered over link 350, wireless network 320, link 351, communication network 322, and link 352, it should be understood that other pathways can be employed. For example, when wireless network 320 is a home wireless network which is not available for communication services, such as a due to RF signal conditions or geographic location, then a roaming communication network, such as communication networks 360-362 might transfer authorization request message 380. When a roaming communication network is used to transfer message 380, then a previous or original MDN for home wireless network 320 can be employed for communications of WCD 310, incurring roaming charges for the authorization handshaking until a temporary MDN can be authorized for WCD 310 over that roaming communication network.

Responsive to authorization request message 380, authorization node 330 processes authorization request message 380 and the included hash result to authorize the temporary MDN. In some examples, the MDN which is awaiting authorization is also transferred in authorization request message 380. If the hash result is authenticated or authorized, then authorization node 330 transfers security grant message 381 for delivery to WCD 310. The communication networks over which security grant message 381 is transferred can be similar to those described above for authorization request message 380. To authenticate or authorize the hash result in authorization request message 380, authorization node 330 can verify the hash result as a correct hash result, such as when a hash result might be tampered with or altered by an unauthorized system or user.

The hash result can be initially generated by secure zone 314 based on seed data, and authorization node 330 can process the hash result to determine if the hash result corresponds to the correct seed data originally used to generate the hash result. In some examples, the seed data is first transferred by authorization node 330 and the seed data is processed using the security key by secure zone 314 to generate the hash result. In other examples, the seed data is the temporary MDN identified for use in operation 402, and authorization node 330 verifies that the hash result corresponds to the proper temporary MDN. Authorization node 330 can include a listing of MDNs authorized for use by WCD 310, and can compare a MDN used as seed data for the hash result to establish that the temporary MDN is authorized.

Once security grant message 381 is received by WCD 310 as authorizing the temporary MDN identified by secure zone 314, then secure zone 314 indicates (404) the temporary MDN to the application for the voice call. The temporary MDN is indicated in authorized MDN message 383 in FIG. 3 to open zone 312. The application executed in open zone 312 initiates (405) the voice call over the roaming communication network using the temporary MDN as the originating device number. In this example, the roaming communication network is third network 362, and the MDN is used as the originating device number for communications with destination device WCD 340.

Once the communication session, such as the voice call initiated in operation 405, is terminated or completed, WCD 310 reverts (406) to a MDN for the home communication network. For example, if the 913-555-1000 number is the MDN associated with home wireless network 320, and 913-555-2000 is used as a temporary MDN for third network 362, then upon termination or completion of the voice call, then WCD 310 reverts back to the 913-555-1000 MDN. In some examples, secure zone 314 revokes authorization for the temporary MDN upon completion or termination of the voice call, and further voice calls over third network 362 must undergo a similar authorization process as described above.

Although the example discussed in FIG. 4 is for an outbound communication session originating at WCD 310, similar processes can be applied to an inbound communication session with WCD 310 as a destination device, such as when WCD 340 initiates a voice call to WCD 310. In examples of incoming or inbound voice calls, open zone 312 of WCD 310 can detect the incoming call which includes an MDN. An indication of the incoming call along with the MDN can be transferred by open zone 312 to secure zone 314. Secure zone 314 can process the indication of the incoming call along with the MDN to determine if the MDN is authorized for use by WCD 310. The authorization process can be similar to that described above for operation 403 where an authentication request message that includes a hash result generated using a security key correlated to the MDN is transferred for delivery to authorization node 330. If authorized by authorization node 330 and indicated in security grant message 381, then secure zone 314 can indicate that the MDN included in the incoming voice call can be responded to by open zone 312, and a voice call can be established using that MDN. If the MDN is not authorized, then the incoming voice call is not established.

Also, although the example discussed in FIGS. 3 and 4 relate to a mobile directory number (MDN) for use by WCD 310, it should be understood that this identification number is merely exemplary. In addition to, or alternatively from, the MDN, the operations described herein can related to any identification number that a WCD might use for communication services on a cellular voice and data network, such as a phone number, mobile identification number (MIN), mobile subscription identification number (MSIN), International mobile Subscriber Identity (IMSI) number, or a media access control (MAC) address, including combinations, variations, and improvements thereof.

In further examples, the MDN is used as a public or portable phone number for WCD 310 that end users have visibility to, such as a phone number that a user of WCD 340 might 'dial' to reach WCD 310. In order to keep the public phone number of WCD 310 consistent across different communication networks, the MDN can be the kept the same for the operations described herein, and the MIN is instead changed according to the temporary needs of WCD 310. The MIN, along with other identification numbers, is typically not used by a user to place a voice call to WCD 310, and is instead a hidden number used by a cellular voice and data network to identify the physical device of WCD 310 instead of the portable phone number which can vary as a user purchases different physical devices. For example, when the MDN remains consistent across different devices purchased by a user, the MIN will change with each physical device that the MDN is assigned to. The identification number selected by secure zone 314 can be the MIN and identify the physical device of WCD 310 on each associated network. Thus, a temporary MIN can be selected by secure zone 314 that allows for 'home' communication services over a normally 'roaming' communication network. A user of WCD 310 can purchase several MINs for use by the same physical device over various roaming communication networks, and use a temporary MIN when home communication services are not available. A roaming communication network can maintain an association between the MIN selected by WCD 310 and the MDN used by end users to reach WCD 310 for voice calls. Thus, a consistent public phone number can be maintained for WCD 310 while WCD 310 obtains temporary 'home' communication services over a roaming communication network using a temporary MIN selected and authorized by secure zone 314.

Figure 5:
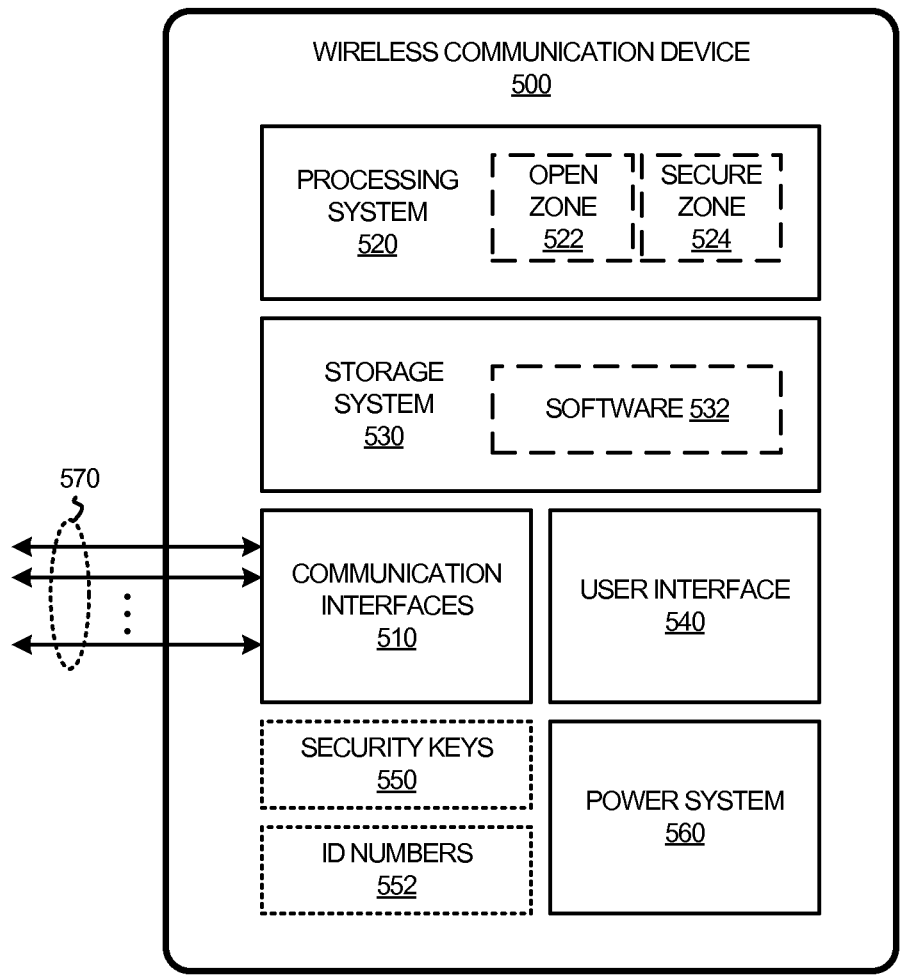
FIG. 5 is a block diagram illustrating a wireless communication device.

FIG. 5 is a block diagram illustrating wireless communication device 500, as an example of WCD 110 found in FIG. 1 or WCD 310 found in FIG. 3, although variations are possible. Wireless communication device 500 includes communication interfaces 510, processing system 520, storage system 530, user interface 540, security keys 550, identification numbers 552, and power system 560.

Communication interface 510, processing system 520, storage system 530, user interface system 540, and power system 560 are communicatively coupled, and can communicate over associated discrete links, common busses, data links, power links, RF links, or other links. Wireless communication device 500 can be distributed or consolidated among equipment or circuitry that together forms the elements of wireless communication device 500. Wireless communication device 500 can optionally include additional devices, features, or functionality not discussed here for purposes of brevity.

Communication interface 510 comprises one or more communication transceiver circuitry portions and communication interface circuitry for communicating over one or more communication links 570 with one or more communication networks. In some examples, communication interface 510 includes wireless transceiver circuitry and antenna equipment for communicating with base stations of a cellular voice and data network, among other communication networks. Communication interface 510 could include transceiver equipment and antenna elements for wirelessly exchanging user communications and overhead communications over the associated ones of links 570, among further links. Portions of the transceiver circuitry, antenna elements, or other transceiver equipment can use identification numbers 552 authorized and selected based on security keys 550 as described herein. Communication interface 510 also receives command and control information and instructions from processing system 520 or user interface system 540 for controlling the operations of communications over links 570. Links 570 could each use various protocols or communication formats as described herein for links 140-141, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

In this example, processing system 520 includes open zone 522 and secure zone 524. Each zone of processing system 520 can be implemented in a separate microprocessor, microprocessor core, virtual core, or other hardware or software partition that separates memory spaces, operating systems, drivers, and other operational hardware and software elements so as to provide a restricted level of access for applications and users to secure zone 524, and a non-restricted level of access for open zone 522. In some examples, open zone 522 comprises a standard core of a processor system, such as for operating an Android, Windows, iOS, or other user-accessible operating system. Likewise, secure zone 524 comprises in some examples, a secure core or "trust zone" core of a processor system which prevents access to the processing and memory elements of secure zone 524 unless authorized through a security exchange or security handshake with an external authorization node.

This partitioned configuration of secure zone 524 differs from user-level password protected access, in that any application that desires to execute on secure zone 524 must first be authorized by a security handshaking process with an external authorization node. Whereas open zone 522 might run applications after a user merely "logs in" or passes a user-level security access, and the applications executed on open zone 522 are not authorized through a security handshaking process with an authorization node.

Storage system 530 can comprise any computer readable storage media or storage device readable by processing system 520 and capable of storing software 532. In some examples, portions of storage system 530 stores security keys 550 and identification numbers 552. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 or other data can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by wireless communication device 500 in general or processing system 520 in particular, direct wireless communication device 500 or processing system 520 to receive a user request in an application for a voice call over a wireless communication network, process the request and a security key associated with the wireless communication network to authorize an identification number for the voice call over the wireless communication network, indicate the identification number to the application, and responsive to the application initiating the voice call using the identification number, exchange communications of the voice call over the wireless communication network, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to receive a user request in an application for a voice call over a wireless communication network, process the request and a security key associated with the wireless communication network to authorize an identification number for the voice call over the wireless communication network, indicate the identification number to the application, and responsive to the application initiating the voice call using the identification number, exchange communications of the voice call over the wireless communication network.

In general, software 532 can, when loaded into processing system 520 and executed, transform processing system 520 overall from a general-purpose computing system into a special-purpose computing system customized to receive a user request in an application for a voice call over a wireless communication network, process the request and a security key associated with the wireless communication network to authorize an identification number for the voice call over the wireless communication network, indicate the identification number to the application, and responsive to the application initiating the voice call using the identification number, exchange communications of the voice call over the wireless communication network, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface system 540 includes equipment and circuitry for receiving user input and control, such as for engaging in voice calls or data sessions, and receiving user instructions for text or video messages, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface system 540 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Security keys 550 comprise one or more security keys, such as those discussed herein. Security keys 550 can be encryption keys, pseudorandom keys, private keys, or other security keys. Security keys 550 are stored in a data structure, which can be a sub-portion of storage system 530 accessible only by secure zone 524. In some examples, a separate physical storage device or memory device is employed to store security keys 550 and make available security keys 550 to secure zone 524 and not to open zone 522. In other examples, security keys 550 are stored in a shared memory space or memory device and accessible only by secure zone 524. Security keys 550 can be hard coded during manufacture of wireless communication device 500, such as by including security keys 550 in programmable read-only memory elements.

Identification numbers 552 comprise one or more device identification numbers for WCD 110, such as those discussed herein. Identification numbers 552 can be phone numbers, mobile directory numbers (MDN), mobile identification numbers (MIN), mobile subscription identification numbers (MSIN), International mobile Subscriber Identity (IMSI) numbers, or media access control (MAC) addresses. Identification numbers 552 are stored in a data structure, which can be a sub-portion of storage system 530 accessible only by secure zone 524. In some examples, a separate physical storage device or memory device is employed to store identification numbers 552 and make available identification numbers 552 to secure zone 524 and not to open zone 522. In other examples, identification numbers 552 are stored in a shared memory space or memory device and accessible only by secure zone 524.

Power system 560 includes circuitry and a power source to provide power to the elements of wireless communication device 500. The power source could include a battery, solar cell, flywheel, capacitor, thermoelectric generator, chemical power source, dynamo, or other power source. In some examples, power system 560 receives power from an external source, such as a wall outlet or power adapter. Power system 560 also includes circuitry to condition, monitor, and distribute electrical power to the elements of wireless communication device 500.

Referring back to FIG. 1, WCD 110 comprises a processing system, a plurality of transceiver portions, security keys, user interface elements, and other communication elements. The transceiver portions typically include amplifiers, filters, modulators, and signal processing circuitry. The transceiver portions can be used to communicate over ones of links 140 and 142, which can include wired, optical, or wireless links. The processing system can include one or more processing portions. WCD 110 can also include user interface systems, memory devices, non-transitory computer-readable storage mediums, software, processing circuitry, or some other communication components. WCD 110 can be a user device, user equipment, subscriber equipment, customer equipment, access terminal, wireless smartphone, computer, mobile Internet appliance, wireless network interface card, media player, game console, or some other communication apparatus, including combinations thereof. Destination device 130 can comprise similar elements as described for WCD 110, as well as landline communication devices.

Communication network 120 comprises communication and control systems for providing access to communication services for other devices and networks. Communication network 120 can each provide communication services including communication routing, link bridging, network communications, data exchange, or other communication services. In some examples, communication network 120 is a cellular voice and data network that can provide voice calls, text messages, data access, or other communication services provided over cellular or wireless communication networks. In some examples, communication network 120 includes equipment to provide wireless access to communication services within different coverage areas to user devices, route communications between content providers and user devices, and facilitate handoffs between equipment of different coverage areas, among other operations. Communication network 120 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Communication links 140 and 141 each use metal, glass, optical, air, space, or some other material as the transport media. Communication links 140 and 141 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication links 140 and 141 can each be a direct link or can include intermediate networks, systems, or devices, and can include a logical network link transported over multiple physical links. Communication links 140 and 141 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

In some examples, communication links 140 and 141 are wireless links, and use the air or space as the transport media. Wireless links 140 and 141 each comprises one or more wireless communication links provided over an associated wireless frequency spectrum or wireless frequency band, and can use various protocols. In this example, wireless links 140 and 141 can comprise Long Term Evolution (LTE), LTE Advanced, Code Division Multiple Access (CDMA), Evolution-Data Optimized (EVDO), single-carrier radio transmission technology link (1×RTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140 and 141 is shown in FIG. 1, it should be understood that links 140 and 141 are merely illustrative to show communication modes or access pathways for WCD 110 and destination device 130. In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device comprising security circuitry that stores one or more security keys, wherein each of the one or more of the security keys correspond to a different identification number for a different wireless communication network, processing circuitry that executes applications, and at least one communication transceiver to communicate over a plurality of wireless communication networks, the method comprising:
   in the processing circuitry, receiving a user request in an application for a voice call over a wireless communication network;
   in the security circuitry, processing at least the request and a security key associated with the wireless communication network to authorize an identification number for the voice call over the wireless communication network, wherein the security key corresponds to the identification number for the voice call over the wireless communication network, and indicating the identification number to the application; and
   in the communication transceiver, responsive to the application initiating the voice call using the identification number, exchanging communications of the voice call over the wireless communication network.

2. The method of claim 1, wherein the application comprises a voice over Long Term Evolution (VoLTE) application.

3. The method of claim 1, wherein the application comprises a voice over Internet Protocol (VoIP) application.

4. The method of claim 1, wherein the identification number for the voice call comprises a mobile directory number (MDN).

5. The method of claim 1, wherein the identification number for the voice call comprises a mobile identification number (MIN).

6. The method of claim 1, wherein the application initiating the voice call using the identification number comprises the application using the identification number as an originating phone number for the voice call.

7. The method of claim 1, wherein processing at least the request and the security key associated with the wireless communication network to authorize the identification number for the voice call over the wireless communication network comprises authorizing the application to use the identification number for the voice call with an external authorization node using a hash result based on at least the security key.

8. The method of claim 7, further comprising:
   transferring the hash result for delivery to the external authorization node, and responsively receiving a security grant transferred by the external authorization node indicating the application is authorized to use the identification number for the voice call.

9. The method of claim 1, further comprising:
   in the security circuitry, receiving an indication of the application with the request, selecting the security key based on an association with the application and the identification number, processing the security key to determine a hash result for the security key, transferring the hash result for delivery to an external authorization node, and responsively receiving a security grant transferred by the external authorization node indicating the application is authorized to use the identification number for the voice call.

10. A wireless communication device, comprising:
    security circuitry that stores one or more security keys, wherein each of the one or more of the security keys correspond to a different identification number for a different wireless communication network;
    processing circuitry that executes applications; and
    at least one communication transceiver to communicate over a plurality of wireless communication networks;
    the processing circuitry configured to receive a user request in an application for a voice call over a wireless communication network;
    the security circuitry configured to process at least the request and a security key associated with the wireless communication network to authorize an identification number for the voice call over the wireless communication network, wherein the security key corresponds to the identification number for the voice call over the wireless communication network, and indicate the identification number to the application; and
    the communication transceiver configured to exchange communications of the voice call over the wireless communication network responsive to the application initiating the voice call using the identification number.

11. The wireless communication device of claim 10, wherein the application comprises a voice over Long Term Evolution (VoLTE) application.

12. The wireless communication device of claim 10, wherein the application comprises a voice over Internet Protocol (VoIP) application.

13. The wireless communication device of claim 10, wherein the identification number for the voice call comprises a mobile directory number (MDN).

14. The wireless communication device of claim 10, wherein the identification number for the voice call comprises a mobile identification number (MIN).

15. The wireless communication device of claim 10, comprising:
    the application configured to use the identification number as an originating phone number for the voice call to initiate the voice call using the identification number.

16. The wireless communication device of claim 10, comprising:
    the security circuitry configured to authorize the application to use the identification number for the voice call with an external authorization node using a hash result based on at least the security key.

17. The wireless communication device of claim 16, comprising:
    the security circuitry configured to transfer the hash result for delivery to the external authorization node, and responsively receive a security grant transferred by the external authorization node indicating the application is authorized to use the identification number for the voice call.

18. The wireless communication device of claim 10, comprising:
    in the security circuitry configured to receive an indication of the application with the request, select the security key based on an association with the application and the identification number, process the security key to determine a hash result for the security key, transfer the hash result for delivery to an external authorization node, and responsively receive a security grant transferred by the external authorization node indicating the application is authorized to use the identification number for the voice call.

* * * * *